US007028168B2

(12) United States Patent
Wadleigh

(10) Patent No.: US 7,028,168 B2

(45) Date of Patent: Apr. 11, 2006

(54) SYSTEM AND METHOD FOR PERFORMING MATRIX OPERATIONS

(75) Inventor: Kevin R. Wadleigh, Plano, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 468 days.

(21) Appl. No.: 10/310,581

(22) Filed: Dec. 5, 2002

(65) Prior Publication Data

US 2005/0033944 A1 Feb. 10, 2005

(51) Int. Cl.
*G06F 9/302* (2006.01)
*G06F 9/44* (2006.01)

(52) U.S. Cl. ........................................ 712/221; 712/241

(58) Field of Classification Search ................ 712/221, 712/241
See application file for complete search history.

(56) References Cited

U.S. PATENT DOCUMENTS 4,697,247 A 9/1987 Grinberg et al.
5,099,447 A 3/1992 Myszewski
5,905,666 A 5/1999 Hoffman et al.
6,035,125 A * 3/2000 Nguyen et al. ............. 717/160
6,055,556 A 4/2000 Barak et al.
6,560,676 B1 * 5/2003 Nishimoto et al. ......... 711/128
2004/0093550 A1 * 5/2004 Kadatch et al. ............. 714/752

OTHER PUBLICATIONS

M. Kandemir et al., Compiler Algorithm for Optimizing Locality and parallelism on Shared and Distributed Memory Machines, IEEE 1997, pp. 236-247.*
Wadleigh and Crawford, "Software Optimization for High Performance Computing", Prentice Hall, 2000, pp. 281-292.

* cited by examiner

*Primary Examiner*—Daniel H. Pan

(57) ABSTRACT

A system for performing matrix operations utilizes a processor, memory, and a matrix operation manager. The processor has a memory cache. The memory is external to the processor and stores first and second matrices. The matrix operation manager is configured to mathematically combine the first matrix with the scond matrix utilizing a hoisted matrix algorithm for hoisting values of the first matrix, and the hoisted matrix algorithm has an outer loop and an inner loop that is performed to completion for each iteration of the outer loop. The matrix operation manager, for each iteration of the outer loop, is configured to load to the cache and to write to a contiguous portion of the memory, before performing the inner loop, values from the first matrix that are to be combined, via performance of the inner loop, with values from the second matrix.

22 Claims, 3 Drawing Sheets

SYSTEM AND METHOD FOR PERFORMING MATRIX OPERATIONS

BACKGROUND OF THE INVENTION

1. Field of the Invention

The present invention generally relates to data processing techniques and, in particular, to a system and method for performing matrix operations.

2. Related Art

In some computer applications, it is desirable to perform various matrix operations, such as matrix addition and/or matrix multiplication. Matrices can sometimes comprise a large amount of data, thereby causing matrix operations to consume significant processing time. Thus, various techniques have been developed for enabling computer processors to efficiently process matrix operations.

Unfortunately, a limiting factor in matrix operation efficiency is the cache size of the processor executing the matrix operation. Indeed, when the data sizes of the matrices being mathematically combined become so large such that each of the matrices cannot fit into the processor's cache, the matrices are typically partitioned into smaller matrix portions. Corresponding matrix portions of the matrices are then sequentially combined by the processor.

In this regard, the processor typically retrieves a set of corresponding matrix portions from each of the matrices and then mathematically combines the corresponding matrix portions to yield a combined matrix portion. This combined matrix portion is then returned to memory, and the next set of corresponding matrix portions is then retrieved and combined. This process is repeated for different portions of the matrices until the matrix operation is complete.

By sequentially operating on small portions of the matrices, the number of cache misses that occur within the processor for the matrix operation can be reduced, thereby helping to optimize the performance of the processor in performing the matrix operation. However, partitioning and operating on the matrices, as described above, can introduce various delays that adversely impact the performance of the processor.

For example, it is sometimes necessary and/or desirable to temporarily store the partitioned matrix portions into a temporary contiguous memory workspace while the processor is operating on the partitioned matrix portions. This copying can help to further reduce the occurrence of cache misses, thereby helping to reduce the bandwidth requirements for the bus between the processor and memory. However, the copying of these partitioned matrix portions into the memory workspace can introduce significant delays, particularly for large matrices that are partitioned into a large number of matrix portions. Such copying delays typically occur during the time periods when a new set of matrix portions are copied into the memory workspace in order to replace a previously processed set of matrix portions.

SUMMARY OF THE INVENTION

Generally, the present invention provides a system and method for performing matrix operations.

A system for performing matrix operations in accordance with an exemplary embodiment of the present invention utilizes a processor, memory, and a matrix operation manager. The processor has a memory cache. The memory is external to the processor and stores first and second matrices. The matrix operation manager is configured to mathematically combine the first matrix with the second matrix utilizing a hoisted matrix algorithm for hoisting values of the first matrix, and the hoisted matrix algorithm has an outer loop and an inner loop that is performed to completion for each iteration of the outer loop. The matrix operation manager, for each iteration of the outer loop, is configured to load to the cache and to write to a contiguous portion of the memory, before performing the inner loop, values from the first matrix that are to be combined, via performance of the inner loop, with values from the second matrix.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Figure 1:
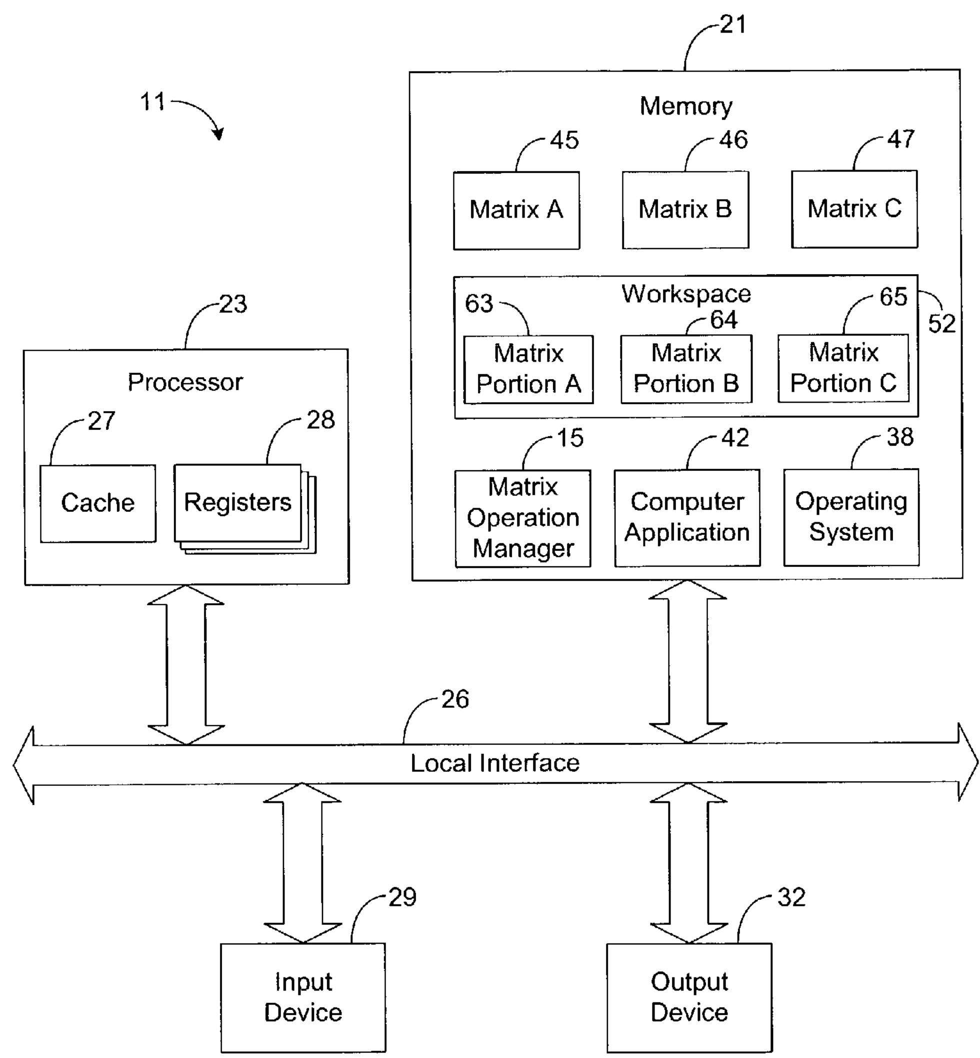
FIG. 1 is a block diagram illustrating a computer system employing a conventional matrix operation manager for performing matrix operations in accordance with the prior art.

FIG. 1 depicts a conventional computer system 11 capable of performing matrix operations. As shown by FIG. 1, the system 11 comprises a matrix operation manager 15 for controlling matrix operations in accordance with techniques that will be described in more detail herein. The matrix operation manager 15 is typically implemented in software and stored in the computer system's memory 21, as shown by FIG. 1.

The computer system 11 of FIG. 1 further comprises at least one conventional processor 23 that communicates to and drive the other elements within the system 11 via a local interface 26, which can include at least one bus. As shown by FIG. 1, the processor 23 comprises a local memory cache 27 and at least one local register 28 for temporarily storing data being processed by the processor 23.

Furthermore, an input device 29, for example, a keyboard or a mouse, can be used to input data from a user of the system 11, and an output device 32, for example, a screen display or a printer, can be used to output data to the user. The system 11 also comprises an operating system 38 for controlling the resources of the computer system 11 in accordance with known or future-developed techniques.

At least one computer application 42 is stored in the memory 21 and executed by the processor 23. The computer application 42 comprises at least one instruction for performing matrix operations. For example, matrices "A," "B," and "C", respectively associated with reference numbers 45–47, are stored in memory 21, as shown by FIG. 1. Further, the computer application 42 comprises an instruction for calling the matrix operation manager 15, which is configured to perform the following operation:

$$C=C+\mathrm{ALPHA}*A*B,$$

where "ALPHA" is a scalar value. When processor 23 executes such an instruction, the processor 23 informs the operating system 38 that the matrix operation manager 15 is to be called, and in response, the operating system 38 invokes the matrix operation manager 15. The matrix operation manager 15 then performs the foregoing matrix operation, which will be referred to as "the instructed matrix operation."

Various conventional techniques have been developed to enable the manager 15 to more efficiently perform matrix operations. As an example, to perform the instructed matrix operation described above, the matrix operation manager 15 may comprise code for performing the following algorithm, which includes three nested "DO" loops:

```
DO I = 1, M
    DO J = 1, N
        DO L = 1, K
            C(I,J) = C(I,J) + ALPHA * A(I,L) * B(L,J)
        ENDDO
    ENDDO
ENDDO
```

Note that the values of "K," "M," and "N" correspond to the row and column sizes of matrices 45–47. In this regard, for illustrative purposes, assume that the sizes of matrices 45–47 are "M"×"K," "K"×"N," and "M"×"N," respectively.

While implementation of the foregoing algorithm enables performance of the instructed matrix operation, memory bandwidth is not optimized. In this regard, three load instructions (i.e., loads of "A," "B," and "C") and one store instruction (i.e., store of"C") are performed for each fused multiply-addition (FMA) executed within the "DO L" loop, likely resulting in a high number of cache misses during performance of the instructed matrix operation. For better performance, it is generally desirable for the ratio of memory operations-to-FMAs to be as low as possible in order to help minimize the number of cache misses that are likely to occur in performing the instructed matrix operation.

Thus, in an attempt to optimize memory bandwidth, algorithms that "hoist" the "B" value outside of a "DO" loop have been previously implemented. Code for implementing such an algorithm, which may be referred to as a "hoisted B" algorithm, may be expressed as follows:

```
DO J = 1, N
    DO L = 1, K
        B1 = ALPHA * B(L,J)
        DO I = 1, M
            C(I,J) = C(I,J) + B1 * A(I,L)
        ENDDO
    ENDDO
ENDDO
```

The matrix manager 15 may be configured to load the "B" value (i.e., "B1") into a register 28 outside the "DO I" loop and thereby eliminate the overhead of continually loading the "B" value into the cache 27 and register 28 again and again for each iteration of the "DO I" loop. Although such an algorithm improves matrix operation performance, the memory bandwidth requirements are still very high as there are two loads (i.e., loads of "A" and "C") and one store (i.e., store of "C") for each FMA executed within the "DO I" loop.

Moreover, the "hoisted B" algorithm described above can be further improved by utilizing an "unrolling" approach, in which additional FMAs are added to the "DO I" loop and additional "B" values for supporting the additional FMAs are hoisted outside of the "DO I" loop. When the "DO J" and "DO L" loops are both unrolled, the bandwidth requirements can be significantly reduced. A conventional 2×2 unrolling approach can be carried out by implementing the following code:

```
DO J = 1, N, 2
    DO L = 1, K, 2
        B1 = ALPHA * B(L,J)
        B2 = ALPHA * B(L,J+1)
        B3 = ALPHA * B(L+1,J)
        B4 = ALPHA * B(L+1,J+1)
        DO I = 1, M
            C(I,J) = C(I,J) + B1 * A(I,L) + B3 * A(I,L+1)
            C (I,J+1) = C(I,J+1) + B2 * A(I,L) + B4 * A(I,L+1)
        ENDDO
    ENDDO
ENDDO
```

Note that the "B" values (i.e., "B1," "B2," "B3," and "B4" ) are hoisted outside of the "DO I" loop. In implementing the above code, there are four loads and two stores for four executions of FMA instructions. Thus, the memory operation-to-FMA ratio has been improved by a factor of two, resulting in lower memory bandwidth requirements.

Note that the number of "B" values typically hoisted outside of the "DO I" loop for a "y"×"y" unrolling, where "y" represents any integer value, is equal to "y" * "y". For example, the number of hoisted "B" values for a 2×2 unrolling is typically four, as shown via the above algorithm. The number of hoisted "B" values for a 4×4 unrolling is typically sixteen, and the number of hoisted "B" values for a 32×32 unrolling is typically 1024. If all of the "B" values can be hoisted outside of the "DO I" loop and maintained in registers 28, then for a "y"×"y" unrolling, there are "y" loads of both "A" and "C" for each iteration of the "DO I" loop, and there are "y" stores of "C" for each iteration of the "DO I" loop.

Moreover, for higher levels of unrolling (i.e., "y"×"y" unrollings with higher values of "y"), the ratio of memory operations-to-FMA executions and, therefore, the memory bandwidth requirements can be reduced. Indeed, assuming that the system 11 is capable of executing two FMAs per cycle, that the values of "A" and "C" are loaded from memory 21 for each iteration of the "DO I" loop, and that each data point is eight bytes in length, the performance requirements of the system 11 in completing the instructed matrix operation may be characterized by the following table.

TABLE 1

| Un-rolling | Memory instruc-tions | Number of bytes | Number of FMAs | Number of cycles due to FMAs | Number of bytes per cycle from memory | Number of bytes per cycle from cache |
|---|---|---|---|---|---|---|
| 1 × 1 | 3 | 24 | 1 | 0.5 | 48 | 48 |
| 2 × 2 | 6 | 48 | 4 | 2 | 24 | 24 |
| 4 × 4 | 12 | 96 | 16 | 8 | 12 | 12 |
| 8 × 8 | 24 | 192 | 64 | 32 | 6 | 6 |
| 16 × 16 | 48 | 384 | 256 | 128 | 3 | 3 |
| 32 × 32 | 96 | 758 | 1024 | 512 | 1.5 | 1.5 |

By examining Table 1, it is clear that memory bandwidth requirements can be significantly reduced by increasing the unrolling size. However, the unrolling size is often limited by the hardware architecture of the processor 23. More specifically, the unrolling size is often limited by the number of registers 28 within the processor 23. To better illustrate the foregoing, a conventional process for performing a 2×2 unrolling according to the approach previously described above will now be described in more detail.

Initially, the matrix operation manager 15, when invoked by the operating system 38 to perform the instructed matrix operation, allocates a workspace 52 having a size equal to or less than the size of the cache 27. The matrix manager 15 then copies portions 63–65 of matrices "A," "B," and "C" into the workspace 52, which is external to the processor 23. The sizes of portions 63–65 are typically congruent and are selected such that all of the portions 63–65 can simultaneously fit in the cache 27. As an example, the matrix manager 15 initially may copy the first "x" rows of matrices "A," "B," and "C" into the workspace 52, where "x" represents an integer value. Note that upon the foregoing copy operation, the matrix portions 63–65 should reside in the cache 27 as well as in the workspace 52.

To perform the first iteration of the "DO L" loop, the manager 15 loads the values of "B1," "B2," "B3," and "B4" into the registers 28. In this regard, the matrix operation manager 15 transmits, to the processor 23, instructions that cause the values of "B(L,J)," "B(L,J+1)," "B(L+1,J)," and "B(L+1,J+1)," to be multiplied by "ALPHA" before being stored in the registers 28. After the "B" values are stored in the registers 28, the matrix manager 15 then performs the "DO I" loop. In performing this loop, "C" values in the matrix portion 65 are replaced with values calculated via execution of the FMAs within the "DO I" loop. Once the "DO I" loop is completed, another iteration of the "DO L" loop is performed. In this regard, new "B" values are loaded into the registers 28 and are utilized to perform the "DO I" loop yet again. Iterations of the "DO L" loop continue in this manner until the "DO J" loop is completed.

Note that the "B" values are hoisted out of the "DO I" loop, and new "B" values are loaded only after the "DO I" loop is completed for an iteration of the "DO L" loop. By having the "B" values hoisted out of the "DO I" loop in this way, cache misses that occur due to the loading of "B" values into the cache 27 are reduced. Further, when "B" values are overwritten in the cache 27, it is often unnecessary for the overwritten "B" values to be retrieved from memory 21 since the overwritten "B" values of interest (i.e., the "B" values being utilized to currently perform the "DO I" loop) are stored in the registers 28.

As the "DO I" loop is being performed, each of the "C" values in the portion 65 is eventually replaced via the FMAs of the "DO I" loop. When this occurs, the matrix manager 15 writes the portion 65 back into matrix "C" and then copies new portions 63–65 of the matrices "A," "B," and "C" into the workspace 52 such that the "DO I" loop may continue based on the new portions 63–65 stored in the workspace 52. This repeated copying of new portions 63–65 into the workspace 52 often consumes significant processing time. Further, while cache misses are likely to be relatively low between successive copies of new portions 63–65 to the workspace 52, cache misses become significantly higher immediately following a time period when a replaced portion 65 is written back to matrix "C" and new portions 63–65 are copied to the workspace 52.

Note that the level of unrolling performed by the system 11 is limited by the number of registers 28 included in the processor 23. In this regard, to perform the 2×2 unrolling described above, the processor 23 should have four dedicated registers 28 (i.e., one register 28 for each of the hoisted "B" values), assuming that each register 28 stores only one "B" value. Moreover, to perform a "y"×"y" unrolling according to similar techniques, "y"×"y" or, in other words, "$y^2$" registers 28 are generally required. As an example, performing a 32×32 unrolling according to the foregoing techniques generally requires 1024 processor registers 28, and very few conventional processors 23 comprise such a large total number of registers 28. As a result, many conventional systems 11 limit the level of unrolling performed by the matrix manager 15. However, as previously described hereinabove with regard to the discussion of Table 1, a higher unrolling size is generally desirable to improve performance and reduce memory bandwidth requirements.

In general, embodiments of the present invention perform matrix operations using a "hoisted B" algorithm, such as one of the conventional "hoisted B" algorithms described above. However, by implementing such a "hoisted B" algorithm via techniques in accordance with the present invention, as will be described in more detail hereinbelow, the "hoisted B" algorithm can be performed more efficiently and with reduced memory bandwidth requirements.

Figure 2:
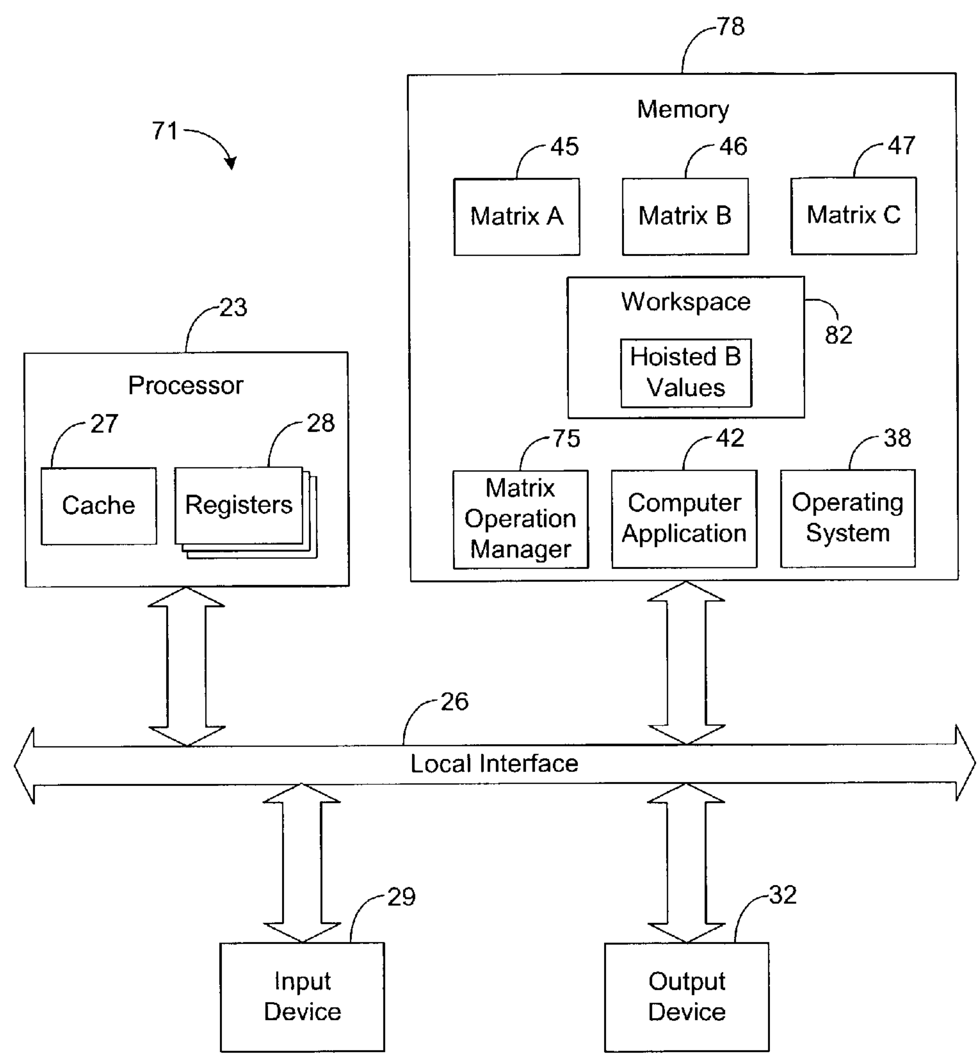
FIG. 2 is a block diagram illustrating a computer system employing a matrix operation manager for performing matrix operations in accordance with an exemplary embodiment of the present invention.

FIG. 2 depicts a computer system 71 capable of performing matrix operations in accordance with an exemplary embodiment of the present invention. As can be seen by comparing FIG. 1 to FIG. 2, the system 71 shown by FIG. 2 is similar to the conventional system 11 shown by FIG. 1 except that the system 71 comprises a matrix operation manager 75 for controlling matrix operations in accordance with an embodiment of the present invention, as will be described in more detail hereafter.

In this regard, the system 71 preferably performs an instructed matrix operation for mathematically combining (e.g., multiplying) matrices "A," "B," and "C" according to a "hoisted B" algorithm (i.e., an algorithm that hoists values of one of the matrices out of an inner loop, such as an inner "DO" loop, for example), which also may be referred to as a "hoisted matrix algorithm." However, for each iteration of the outer loop, referred to hereafter as the "DO L" loop, the hoisted "B" values needed for completing the inner loop, referred to hereafter as the "DO I" loop, are not loaded into registers 28 that are dedicated for holding such values throughout the performance of the "DO I" loop. Instead, the matrix operation manager 75 initially copies such hoisted "B" values to a contiguous area 82 of memory 78 (e.g., a temporary memory workspace) that is external to the processor 23. During this copying, the hoisted "B" values are preferably encached (i.e., loaded into the cache 27).

The "DO L" loop iteration is then completed by performing the "DO I" loop to completion in which any hoisted "B" values used for completing the "DO I" loop are retrieved from the memory workspace 82 and loaded into the cache 27 as they are needed, if such "B" values cannot first be found in the cache 27. Since the hoisted "B" values are maintained in memory 78 and cache 27 rather than in registers 28 dedicated for holding the "B" values throughout the performance of the "DO I" loop, the size of the unrolling capable of being performed is not limited by the number of registers 28, as is described above for the conventional system 11, and instead the system 71 may utilize a higher order unrolling in performing the instructed matrix operation.

Note that the storage of "B" values to workspace 82 rather than maintaining the hoisted "B" values in the registers 28 throughout the performance of the "DO I" loop for each "DO L" loop iteration may induce additional cache misses pertaining to the hoisted "B" values, thereby increasing cache bandwidth requirements. However, memory bandwidth savings enabled by utilizing a higher order unrolling may outweigh such costs. Indeed, such memory bandwidth savings may be sufficient enough to eliminate the need to copy large portions of each of the matrices "A," "B," and "C" into a temporary workspace, thereby eliminating the overhead of performing such copying during the instructed matrix operation. Thus, overall, the system 71 is capable of more efficiently performing the instructed matrix operation.

The matrix operation manager 75 can be implemented in software, hardware, or any combination thereof. In a preferred embodiment, as illustrated by way of example in FIG. 2, the matrix manager 75 of the present invention, along with its associated methodology, is implemented in software and stored in memory 78, which is external to the processor 23.

Note that the matrix operation manager 75, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the matrix operation manager 75 may be magnetically stored and transported on a conventional portable computer diskette.

The matrix operation manager 75 is preferably configured to perform at least one matrix operation. For illustrative purposes, assume that the matrix operation manager 75 is configured to perform the following matrix operation:

$$C=C+\mathrm{ALPHA}*A*B,$$

where "ALPHA" is a scalar value, and where "A," "B," and "C," respectively correspond to matrices 45–47 stored in the memory 78 of the system 71, as shown by FIG. 2. The foregoing matrix operation will be referred to hereafter as "the instructed matrix operation." However, it should be noted that, in other embodiments, other types of memory operations may be performed by the matrix operation manager 75. As an example, the matrix operation manager 75 may utilize techniques similar to those described herein in order to perform the following matrix operation:

$$C=C+\mathrm{ALPHA}*A*B^T,$$

where "$B^T$" represents the transpose of "B." Note that other matrix operations are possible in yet other embodiments. In other examples, it is possible for only two matrices to be combined to complete a matrix operation, such as the following matrix operation, for example:

$$C=A*B.$$

In one embodiment, the matrix operation manager 75 preferably performs the instructed matrix operation (i.e., C=C+ALPHA*A*B) in response to execution of a particular function call by the processor 23. In this regard, the processor 23, while executing instructions from the application 42, may receive a function call for invoking the matrix operation manager 75. This function call may specify or otherwise identify an address and a data length for each of the matrices 45–47 and may specify or otherwise identify the scalar "ALPHA."

In executing the function call, the processor 23 may submit, to the operating system 38, a request for invoking the matrix operation manager 75. This request may comprise the specified addresses and data lengths of matrices 45–47. The operating system 38 may then invoke the matrix operation manager 75 and provide the manager 75 with the specified addresses and data lengths of the matrices 45–47. In response to invocation by the operating system 38, the matrix operation manger 75 preferably performs the instructed matrix operation according to techniques that will be described in more detail below. Note that other methodologies for invoking the matrix operation manager 75 and causing the matrix operation manager 75 to perform the instructed matrix operation are possible in other embodiments.

In a preferred embodiment the matrix manager 75 utilizes a "hoisted B" approach with a "y"×"y" unrolling, where "y" represents any positive integer value. In such an approach, the "B" values (i.e., values from matrix "B") are hoisted outside of an inner loop, such as a "DO" loop, for example, that mathematically combines the "A" values (i.e., values from matrix "A"), "B" values (i.e., values from matrix "B"), and the "C" values (i.e., values from matrix "C"). Further, the number of "B" values hoisted outside of the inner loop generally defines the size of unrolling associated with the matrix operation performed by the manager 75.

For example, as set forth above, if the matrix operation manager 75 is configured to perform a "hoisted B" algorithm with a 2×2 level of unrolling, then four "B" values are preferably hoisted outside of the inner loop, and if the matrix operation manager 75 is configured to perform a "hoisted B" algorithm with a 32×32 level of unrolling, then 1024 "B" values are preferably hoisted outside of the inner loop. Note that any known or future-developed "hoisted B" algorithm may be employed by the matrix operation manager 75 in performing the instructed matrix operation. For example, the matrix operation manager 75 may be configured to perform a 2×2 unrolling according to the following "hoisted B" algorithm:

```
DO J = 1, N, 2
    DO L = 1, K, 2
        B1 = ALPHA * B(L,J)
        B2 = ALPHA * B(L,J+1)
        B3 = ALPHA * B(L+1,J)
        B4 = ALPHA * B(L+1,J+1)
        DO I = 1, M
            C(I,J) = C(I,J) + B1 * A(I,L) + B3 * A(I,L+1)
            C (I,J+1) = C(I,J+1) + B2 * A(I,L) + B4 * A(I,L+1)
        ENDDO
    ENDDO
ENDDO
```

In such an embodiment, four "B" values (i.e., "B1," "B2," "B3," and "B4") are hoisted outside of the "DO I" loop. Note that, in other embodiments, higher level unrollings may be performed by the matrix operation manager 75. Indeed, for illustrative purposes, assume that the matrix operation manager 75 is configured to perform a 32×32 level unrolling, in which 1024 "B" values are hoisted outside of the "DO I" loop.

Figure 3:
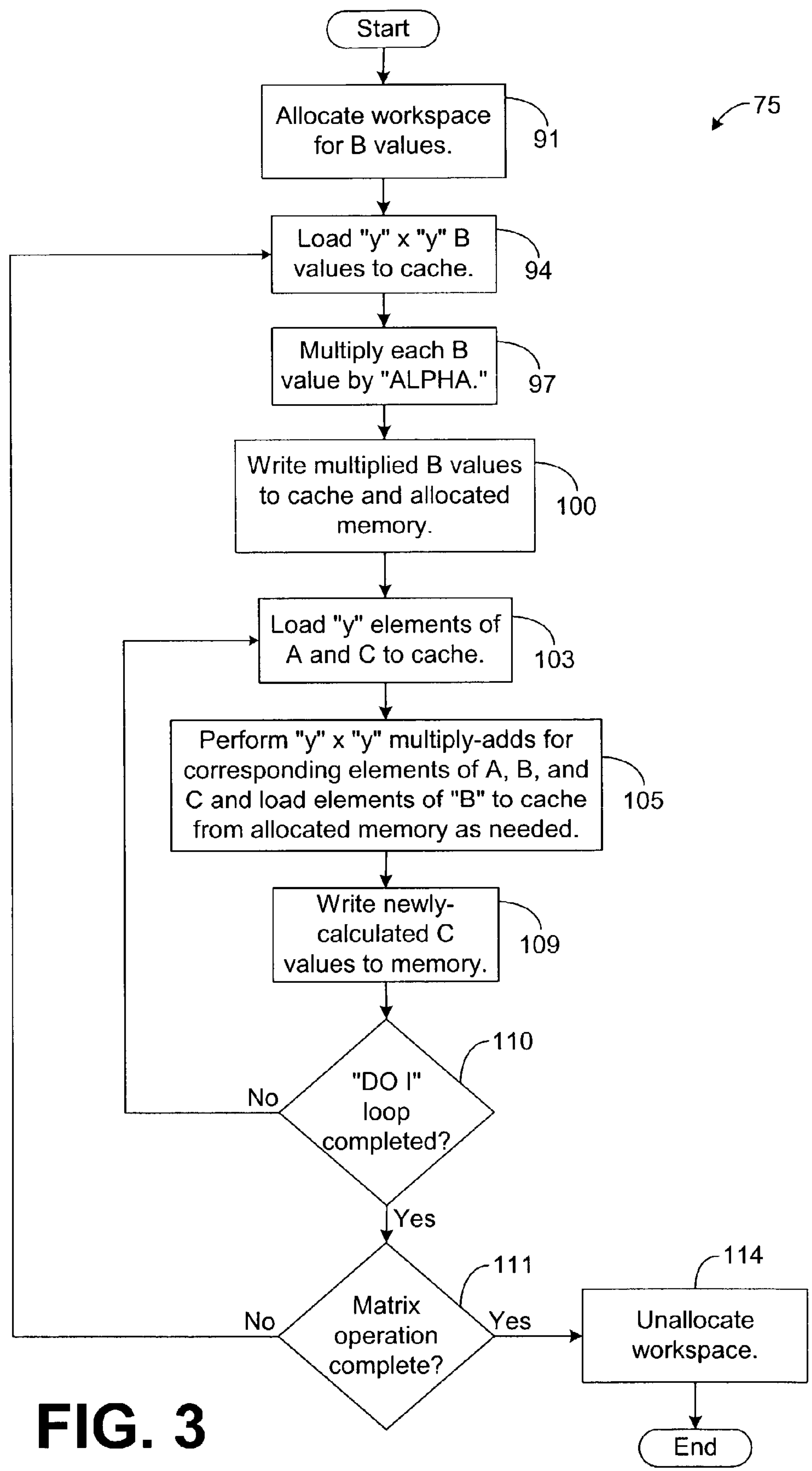
FIG. 3 is a flow chart illustrating an exemplary architecture and functionality of a matrix operation manager, such as is depicted in FIG. 2.

In implementing such a "hoisted B" algorithm, the matrix operation manager 75 preferably performs 1024 fused multiply-adds (FMAs) for each iteration of the "DO I" loop. Moreover, upon invocation, the matrix operation manager 75 preferably allocates a workspace 82 capable of storing at least 1024 "B" values and loads, from matrix "B" to the cache 27, each of the "B" values to be utilized to perform the 1024 FMAs of the first iteration of the "DO L" loop, as shown by blocks 91 and 94 of FIG. 3. The matrix operation manager 75 also preferably writes each of the calculated values (i.e., the results of the FMAs) from block 97 into the allocated workspace 82, as shown by block 100. These values written to the workspace 82 will be referred to hereafter as "hoisted B values."

The matrix operation manager 75 then performs the "DO I" loop for the first "y" columns of matrices "A" and "C." Thus, in the present example, the operation manager 75 preferably loads the first 32 columns of "A" and "C" to the cache 27, as shown by block 103. The operation manager 75 then performs the 1024 FMAs of the first iteration of the "DO I" loop in block 105 of FIG. 3. Note that the registers 28 may be utilized in performing the FMAs of the "DO I" loop. If cache misses occur for any of the hoisted B values, the missing hoisted B values are preferably loaded to the cache 27 from the workspace 82. Further, if cache misses occur for any of the "A" or "C" values, the missing values are preferably loaded into the cache 27 from the matrices 45 and 47 stored in the memory 78.

Upon performing the 1024 FMAs for the current iteration of the "DO I" loop, the first 32 columns of "C" have been calculated, and the matrix operation manager 75, in block 109, preferably stores these newly-calculated "C" values to matrix "C" (i.e., matrix 47), which is residing in the memory 78. Blocks 103, 105, and 109 are repeated for each iteration of the "DO I" loop. Once the "DO I" loop is completed and a "yes" determination is made in block 110, the first iteration of the "DO L" loop is complete, and the aforedescribed process is preferably repeated for each iteration of the "DO L" loop until new values for the entire matrix "C" have been calculated and stored to memory 78, thereby completing the instructed matrix operation.

In particular, after completing the "DO I" loop for the first iteration of the "DO L" loop, the matrix operation manager 75 determines, in block 111, that further iterations of the "DO L" loop are to be performed and that the instructed matrix operation is, therefore, incomplete. Accordingly, the matrix operation manager 75 initiates the next iteration of the "DO L" loop, hereinafter referred to as the "current iteration of the 'DO L' loop," and loops to block 94. Thus, the matrix operation manager 75 loads, from matrix "B" and to the cache 27, the "B" values that are to be utilized for performing the current iteration of the "DO L" loop. These values are multiplied by "ALPHA," in block 97, before being written to the workspace 82 in block 100. These written "B" values are then utilized to perform the 1024 FMAs for each iteration of the "DO I" loop in block 105. Note that the "A" and "C" values utilized to perform the these FMAs are preferably loaded from matrices 45 and 47 in block 103. After writing the newly-calculated "C" values to matrix "C," the matrix operation manager 75 again checks in block 111 to determine whether further iterations of the "DO L" loop are to be performed.

Each iteration of the "DO L" loop is preferably performed in the aforedescribed manner until all of the columns of "C" have been retrieved from memory 78 and replaced with new values calculated via performance of the "DO I" loop. Note that the foregoing occurs when all iterations of the "DO J" and "DO L" loops have been completely performed by the matrix operation manager 75. Once all iterations of the "DO J" and "DO L" loops have been performed, the matrix operation manager 75 may unallocate the workspace 82, as shown by block 114.

Performing the instructed matrix operation according to the aforedescribed techniques helps to improve the performance of the system 71. In this regard, maintaining the hoisted B values in cache 27 and memory 78, rather than in dedicated registers 28 during the performance of the "DO I" loops, as described above, enables the system 71 to perform a higher level of unrolling without the number of registers 28 being a limiting factor. Indeed, the system 71 may perform a "y"×"y" unrolling where a total number of processor registers 28 is less than "y"×"y" or, in other words, "$y^2$." Further, performing a higher level of unrolling helps to reduce the memory bandwidth requirements of the system 71 in performing the instructed matrix operation. Indeed, the performance requirements of the system 71 in completing the instructed matrix operation may be characterized by the following table if it is assumed that: (1) the system 71 is capable of executing two FMAs per cycle, (2) the "B" values are maintained in cache 27 and memory 78, (3) the values of "A" and "C" are loaded for each iteration of the "DO I" loop, and (4) each data point is eight bytes in length.

TABLE 2

| | Memory instructions | Number of bytes | Number of cycles due to FMA's | Number of bytes per cycle from memory | Number of bytes per cycle from cache |
|---|---|---|---|---|---|
| 1 × 1 | 3(C, A) + 1(B) | 24 + 8 = 32 | 0.5 | 48 | 48 |
| 4 × 4 | 2(C, A) + 16(B) | 96 + 128 = 224 | 8 | 12 | 12 |
| 16 × 16 | 48(C, A) + 256(B) | 384 + 2048 = 2432 | 128 | 3 | 19 |
| 32 × 32 | 96(C, A) + 1024(B) | 758 + 8192 = 8950 | 512 | 1.5 | 17.5 |

Moreover, the system 71 may perform a sufficiently high level of unrolling such that the need for copying large portions of matrices "A" and "C" as is performed by the conventional system 11, may be eliminated, thereby helping to improve the overall performance of the system 71. Therefore, although copying of hoisted B values to workspace 82 increases the likelihood that cache misses pertaining to the hoisted B values will occur in performing the matrix operation, the cost of such cache misses may be outweighed by the benefits associated with performing a higher level of unrolling. Accordingly, the copying of hoisted B values to workspace 82 for each iteration of the "DO L" loop and utilizing these copied hoisted B values in performing the inner "DO I" loop, as described above, may enable the overall performance of the system 71 to be improved.

It should be noted that the present invention has been described above as performing matrix operations on matrices comprised of 8-byte real data. However, it should be apparent to one of ordinary skill in the art upon reading this disclosure that the techniques described herein may be similarly employed to manipulate other types of matrix data. In particular, the techniques described herein may be employed to manipulate data of other byte sizes and/or complex data.

The invention claimed is:

1. A system for executing matrix operation instructions, comprising:

a processor having a memory cache, the processor configured to execute a matrix operation instruction;

memory external to the processor, the memory storing first and second matrices; and a matrix operation manager configured to perform a matrix operation by mathematically combining the first matrix with the second matrix utilizing a hoisted matrix algorithm for hoisting values of the first matrix, the hoisted matrix algorithm having an outer loop and an inner loop that is performed to completion for each iteration of the outer loop, the matrix operation manager, for each iteration of the outer loop, configured to load to the cache and to write to a contiguous portion of the memory, before performing the inner loop, values from the first matrix that are to be combined, via performance of the inner loop, with values from the second matrix, wherein the matrix operation manager is configured to load, from the contiguous portion of the memory that is external to the processor, at least one of said values from the first matrix in response to at least one cache miss resulting from performance of the inner loop, and wherein the processor, in executing the matrix operation instruction, is configured to cause the matrix operation manager to perform the matrix operation.

2. The system of claim 1, wherein the matrix operation manager is further configured to retrieve at least one of the first matrix values from the contiguous memory portion and to load the at least one first matrix value to the memory cache if a memory cache miss associated with the first matrix occurs during the performance of the inner loop.

3. The system of claim 1, wherein the matrix operation manager is configured to refrain from copying values from the second matrix to the memory when performing the outer and inner loops.

4. The system of claim 1, wherein the matrix operation manager is configured to mathematically combine the first and second matrices in response to an execution of an instruction by the processor, and wherein the matrix operation manager is further configured to allocate the contiguous portion of the memory in response to the execution of the instruction.

5. The system of claim 1, wherein the matrix operation manager is further configured to mathematically combine each of the first matrix values with a scalar value before writing the first matrix values to the contiguous portion of the memory.

6. The system of claim 1, wherein the matrix operation manager, in response to invocation of the matrix operation manager by the processor, is configured to retrieve, from a portion of the memory accessible by the matrix operation manager, said values from the first matrix and to write the retrieved values to the contiguous portion of the memory.

7. The system of claim 1, wherein the values from the first matrix written to the contiguous portion of the memory for a respective iteration of the inner loop comprise values defining "y" number of rows and "y" number of columns of the first matrix.

8. The system of claim 7, wherein a total number of registers within the processor is less than a value of"$y^2$."

9. The system of claim 1, wherein an iteration of the inner loop is performed to completion by the matrix manager without loading to any register in the processor from the memory at least one of the values written to the contiguous portion of the memory for the iteration.

10. A system for executing matrix operation instructions, comprising:

a processor having a memory cache and registers, the processor configured to execute a matrix operation instruction;

memory external to the processor; and a matrix operation manager configured to perform a matrix operation by mathematically combining a first matrix with a second matrix utilizing a hoisted matrix algorithm, the hoisted matrix algorithm having an outer loop and an inner loop that is performed to completion for each iteration of the outer loop, the inner loop for mathematically combining values from the first matrix with values from the second matrix, the matrix operation manager configured to hoist the first matrix values out of the inner loop via a "y"×"y" unrolling, wherein "y" represents an integer value and wherein a total number of the registers is less than a value of "$y^2$," and wherein the processor, in executing the matrix operation instruction, is configured to cause the matrix operation manager to perform the matrix operation.

11. The system of claim 10, wherein the matrix operation manager is configured to refrain from copying values from the second matrix to the memory when performing the outer and inner loops.

12. The system of claim 10, wherein the matrix operation manager, in hoisting the first matrix values, is configured to mathematically combine each of the first matrix values with a scalar value.

13. The system of claim 10, wherein the matrix operation manager, in hoisting the first matrix values, is configured to load the first matrix values to the memory cache and to write the first matrix values to a contiguous portion of the memory.

14. The system of claim 13, wherein the matrix operation manager is further configured to retrieve at least one of the first matrix values from the contiguous memory portion and to load the at least one first matrix value to the memory cache if a memory cache miss associated with the first matrix occurs during performance of the inner loop.

15. A method for executing matrix instructions, comprising:

executing a matrix operation instruction to combine a first matrix with a second matrix; and performing a matrix operation according to a hoisted matrix algorithm in response to the executing, the hoisted matrix algorithm having an outer loop and an inner loop within the outer loop, wherein the performing comprises, for each iteration of the outer loop:

loading, to a memory cache residing on a processor, values from the first matrix that are to be combined, via performance of the inner loop, with values from the second matrix;

writing the loaded values from the first matrix to a contiguous portion of memory that is external to the processor; and performing the inner loop to completion, the performing the inner loop comprising mathematically combining, via the processor, the first matrix values with the second matrix values and loading, from the contiguous portion of memory that is external to the processor, at least one of said values from the first matrix in response to at least one cache miss resulting from the performing the inner loop, wherein the loading and writing are both performed prior to the performing the inner loop.

16. The method of claim 15, further comprising retrieving at least one of the first matrix values from the contiguous memory portion and loading the at least one first matrix value to the memory cache if a memory cache miss associated with the first matrix occurs during the performing the inner loop.

17. The method of claim 15, further comprising, for each iteration of the outer loop, mathematically combining each of the first matrix values with a scalar value before each of the first matrix values is written to the contiguous portion of memory via said writing.

18. The method of claim 15 wherein the values from the first matrix written to the contiguous portion of the memory for a respective iteration of the inner loop comprise values defining "y " number of rows and "y" number of columns of the first matrix.

19. The method of claim 18, wherein a total number of registers within the processor is less than a value of "$y^2$. "

20. A method for utilizing a processor to execute matrix operation instructions, the processor having a plurality of registers, comprising:

executing a matrix operation instruction to combine a first matrix with a second matrix; and performing a matrix operation according to a hoisted matrix algorithm in response to the executing, the hoisted matrix algorithm having an outer loop and an inner loop within the outer loop, wherein the performing comprises:

performing the inner loop to completion, the performing the inner loop comprising mathematically combining, via the processor, values from the first matrix with values from the second matrix; and hoisting the first matrix values out of the inner loop via a "y"×"y" unrolling, wherein "y" represents an integer value and wherein a total number of the registers is less than "$y^2$".

21. The method of claim 14, wherein the hoisting comprises: loading, to a memory cache residing on the processor, the first matrix values; writing the first matrix values to a contiguous portion of memory that is external to the processor; and if a memory cache miss associated with the first matrix occurs during the performing; inner loop, retrieving at least one of the first matrix values from the contiguous memory portion and loading the at least one first matrix value to the cache.

22. The method of claim 20, wherein the hoisting comprises mathematically combining each of the first matrix values with a scalar value.

* * * * *